US011175710B2

(12) United States Patent
Bin Muhamad Azmi et al.

(10) Patent No.: US 11,175,710 B2
(45) Date of Patent: Nov. 16, 2021

(54) ETHERNET POWER DISTRIBUTION SYSTEMS, CONTROLLERS, AND METHODS

(71) Applicant: Motorola Solutions, Inc., Chicago, IL (US)

(72) Inventors: Mohd Azrin Bin Muhamad Azmi, Bayan Lepas (MY); San Lee Khor, Bukit Mertajam (MY); Arthur Christopher Leyh, Spring Grove, IL (US); Rodney Hagen, Lake in the Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 63 days.

(21) Appl. No.: 16/416,019

(22) Filed: May 17, 2019

(65) Prior Publication Data

US 2020/0363851 A1 Nov. 19, 2020

(51) Int. Cl.
*G06F 1/26* (2006.01)
*G06F 1/3206* (2019.01)
*H04L 12/10* (2006.01)

(52) U.S. Cl.
CPC ............ *G06F 1/266* (2013.01); *G06F 1/3206* (2013.01); *H04L 12/10* (2013.01)

(58) Field of Classification Search
CPC ......... G06F 1/266; G06F 1/3206; H04L 12/10
See application file for complete search history.

(56) References Cited

U.S. PATENT DOCUMENTS 6,535,983 B1 3/2003 McCormack et al.
7,356,588 B2 4/2008 Stineman, Jr. et al.
2013/0111245 A1* 5/2013 Giat .................. H04L 12/10
713/323
2014/0139014 A1* 5/2014 Sontag .................. H04L 12/10
307/1
2017/0118030 A1 4/2017 Love
2018/0074567 A1 3/2018 Darshan

FOREIGN PATENT DOCUMENTS

WO 01/77699 10/2001
WO 2015/017708 2/2015

OTHER PUBLICATIONS

"https://web.archive.org/web/20150914195723/https://www.perle.com/products/10-100-poe-ethernet-extender.shtml", Sep. 15, 2015.*
Combined Search and Examination Report for copending GB2005932.5 dated Jan. 11, 2021.

* cited by examiner

*Primary Examiner* — Gary Collins
(74) *Attorney, Agent, or Firm* — Baker Botts L.L.P.

(57) ABSTRACT

An exemplary system in accordance with some embodiments includes a field-replaceable unit (FRU) and a controller. The FRU may include an FRU Ethernet coupler comprising an FRU return node and an FRU power node. The controller may include a controller Ethernet coupler including a first controller node and a second controller node. The controller may include a comparator and a switch. The controller may be operable to detect whether the FRU is connected to the controller by comparing a voltage at the first controller node to a reference voltage. The controller is also thereby operable to, when the controller Ethernet coupler is connected to the FRU Ethernet coupler with an Ethernet cable, cause current flow from a voltage source to the FRU.

14 Claims, 2 Drawing Sheets

ETHERNET POWER DISTRIBUTION SYSTEMS, CONTROLLERS, AND METHODS

BACKGROUND OF THE INVENTION

A system with a controller may be connected to multiple field-replaceable units (FRUs) in order to perform any computational task. Use of FRUs allows for use of circuits that are easily separable from the system and replaceable such that the entire system need not be replaced in the event of any failure. The controller may, for example, house the FRUs such that the FRUs slide into slots of the controller. The FRUs may be connected to the controller through Ethernet for electronic communications. For ease of use, and to reduce complexity and the number of wires, some FRUs may receive power from the controller through the Ethernet connection. Receiving power through the Ethernet connection may be referred to as power over Ethernet ("POE"). POE systems can often be used with numerous FRUs and numerous Ethernet cable connections.

SUMMARY

The systems, controllers, and methods of this disclosure address many problems with POE systems such as delay, inefficiency, and cost. In some exemplary embodiments, a system includes a field-replaceable unit (FRU). The FRU may include an FRU Ethernet coupler comprising an FRU return node and an FRU power node. The Ethernet coupler permits Ethernet connection with a controller.

Some exemplary embodiments include a controller. The controller may include a controller Ethernet coupler comprising a first controller node and a second controller node. To supply power from the controller to the FRU, the first controller node and the FRU return node may be correspondingly positioned such that when the controller Ethernet coupler is connected to the FRU Ethernet coupler with an Ethernet cable, the first controller node and the FRU return node are coupled, and when the controller Ethernet coupler is connected to the FRU Ethernet coupler with a crossover cable, the first controller node and the FRU return node are coupled. Additionally, the second controller node and the FRU power node may be correspondingly positioned such that, when the controller Ethernet coupler is connected to the FRU Ethernet coupler with an Ethernet cable, the second controller node and the FRU power node are coupled.

To detect an FRU connection to the controller, the controller may effectively "determine" whether it is receiving a short at the first controller node. A short may be detected by comparing the voltage at the node receiving the short to a reference voltage. Accordingly, the controller may include a comparator including a first comparator input node, a second comparator input node, and a comparator output node. The first controller node may be coupled to the first comparator input node so that the comparator may compare any received voltage to a reference voltage.

Upon receiving a short, the system may be operable to trigger a switch to initiate supplying power to the FRU. The system may include a switch that includes a switch control node, a switch power node, and a switch output node. To be driven by the result of the comparison at the comparator, the switch control node is coupled to the comparator output node, the switch power node is coupled to a voltage source, and the switch output node is coupled to the second controller node. By supplying power to the second controller node, which is coupled to the FRU, the controller supplies power to the FRU.

Given the configuration above, the controller is thereby operable to detect whether the FRU is connected to the controller by comparing a voltage at the first controller node to a reference voltage. The controller is also operable to, when the controller Ethernet coupler is connected to the FRU Ethernet coupler with an Ethernet cable, cause current flow from the voltage source, through the switch output node, to the second controller node, and to the FRU power node to supply power to the FRU. Therefore, the system is able to detect when an FRU is connected and supply power to the FRU.

Many systems have numerous cables, including both Ethernet cables and crossover cables. The crossover cables may look like Ethernet cables but have internal crossing wires which have different pin-to-pin connections than a standard Ethernet cable. To permit functioning of the controller when it receives a crossover cable or an Ethernet cable, and to supply power from the controller to the FRU, the system may include a third controller node coupled to the switch output node. The third controller node and the FRU power node may be correspondingly positioned such that when the controller Ethernet coupler is connected to the FRU Ethernet coupler with a crossover cable, the third controller node and the FRU power node are coupled and the controller is thereby operable to cause current flow from the voltage source, through the switch output node, to the third controller node, and to the FRU power node to supply power to the FRU.

A relatively high steady state voltage difference between the first comparator input node and the second comparator input node can prevent temporary fluctuations which cause unintentional driving or opening of the switch. Accordingly, in some systems, the switch output node may be coupled to the second comparator input node such that there is an increased steady-state voltage difference between the first comparator input node and the second comparator input node when the switch is triggered to cause current flow from the voltage source through the switch output node.

Current spikes may occur in the system upon, for example, shorting the first controller node. To protect from such current spikes, the system may include inductive coils. In some systems, the controller Ethernet coupler may include a return controller node coupled to an inductive coil. Some systems may include an FRU node coupled to an inductive coil.

Disclosed herein are controllers that are operable to provide POE to one or more FRUs. The controllers may be operable to detect when an FRU is connected and supply power to an FRU with high efficiency. An exemplary controller includes a controller Ethernet coupler with a first controller node and a second controller node. The controller Ethernet coupler may be operable to receive an Ethernet cable. The controller may include a comparator including a first comparator input node, a second comparator input node, and a comparator output node. The first controller node may be coupled to the first comparator input node. The controller may also include a switch including a switch control node, a switch power node, and a switch output node. The switch control node may be coupled to the comparator output node. The switch power node may be coupled to a voltage source. The switch output node may be coupled to the second controller node. The controller may thereby be operable to detect whether an FRU is connected to the controller by comparing a voltage at the first controller node to a reference voltage. The controller may also thereby be operable to, when the controller Ethernet coupler is connected to an FRU Ethernet coupler, cause current flow from the voltage source, through the switch output node, and to the second controller node to supply power to the FRU.

To permit functionality with a crossover cable, the controller Ethernet coupler may include a third controller node. The third controller node may be coupled to the switch output node such that, when the controller Ethernet coupler is connected to the FRU Ethernet coupler with a crossover cable, the controller is thereby operable to cause current flow from the voltage source, through the switch output node, and to the third controller node to supply power to the FRU.

A relatively high steady state voltage difference between the first comparator input node and the second comparator input node can prevent temporary fluctuations which cause unintentional driving or opening of the switch. The switch output node may be coupled to the second comparator input node such that there is an increased steady-state voltage difference between the first comparator input node and the second comparator input node when the switch is triggered to cause current flow from the voltage source through the switch output node.

Current spikes may occur in the system upon, for example, shorting the first controller node. To protect from such current spikes, the system may include one or more inductive coils. The controller Ethernet coupler may include a return controller node coupled to at least a first inductive coil.

Disclosed herein are methods of selectively providing POE in accordance with some embodiments. The method may include receiving an Ethernet cable coupled to an FRU at a controller Ethernet coupler, thereby grounding a first controller node. To determine whether the FRU is connected to a controller, the method may include comparing a voltage at the first controller node of a controller Ethernet coupler against a voltage reference. The method may include, in response to the grounding the first controller node, triggering a switch to cause current to flow to a second controller node of the controller Ethernet coupler, thereby supplying power to an FRU.

To prevent high current from damaging any magnetics of the system, the method may include receiving a current drawn from a return node of the controller Ethernet coupler with at least a first inductive coil. The method may also include receiving a current drawn from a return node of the controller Ethernet coupler with at least a second inductive coil.

It may be useful to supply POE with a crossover cable instead of an Ethernet cable. Accordingly, the method may include receiving the FRU with a crossover cable at the controller Ethernet coupler, thereby grounding the first controller node. The method may include, in response to the grounding the first controller node, triggering the switch to cause current to flow to a third controller node of the controller Ethernet coupler, thereby supplying power to the FRU.

A relatively high steady state voltage difference between the voltage at the first comparator input node and the second comparator input node may cause unintentional supplying or interrupting power supplied to the FRU. The method may include increasing the reference voltage in response to grounding the first controller node.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
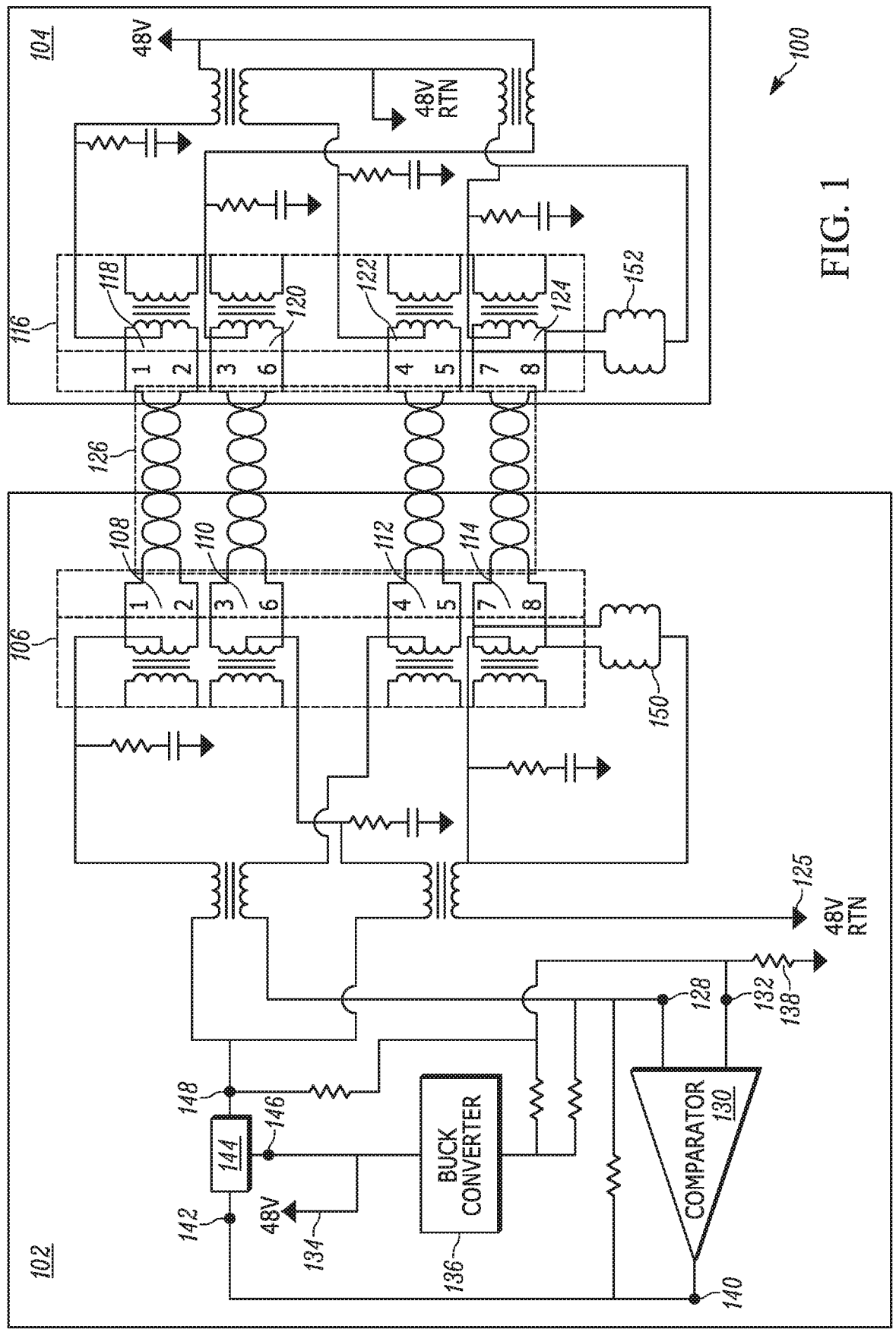
FIG. 1 is a schematic diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One problem with existing POE systems is inefficiency and cost. To save power, some power over Ethernet systems use a processor to detect whether a field-replaceable unit (FRU) is connected to a controller. The controller will then only supply power to an Ethernet coupler of the controller when an FRU is connected to the coupler. But more power could be saved. Despite checking whether an FRU is connected, such systems can still be inefficient, using energy to check and recheck whether an FRU is connected. Such systems can also be expensive, with the added cost of a processor. Using a processor also causes power to be supplied after a delay based on the processing time and relaying of instructions by the processor.

Another way existing POE systems are inefficient is in their handling of mis-cabling. Mis-cabling can occur when the wrong type of Ethernet cable is used for a connection. For example, crossover cables are sometimes used to connect a controller to an FRU. Crossover cables are Ethernet cables except that some wires within the cable cross each other, such that some wires are routed to from one end of the crossover cable to a different location at the other end over the crossover cable with respect to the end location of a standard Ethernet cable. When the connections need to be changed, an accidental use of a crossover cable instead of a standard Ethernet cable (or vice versa) can cause communication error, cause damage, or prevent the FRU from working properly. To solve this mis-cabling problem, some POE systems use diode bridges that allow current to flow from the controller to the FRU in either direction. By using these diode bridges, these POE systems waste power across the diodes, causing the POE system to be inefficient.

The systems, controllers, and methods of this disclosure address many problems with POE systems such as delay, inefficiency, and cost. FIG. 1 depicts an example of a system 100 with a controller 102 coupled to an FRU 104 according to some embodiments. The system 100 and the components shown therein are simply examples and may be reconfigured, rearranged, removed, added to, substituted, or a combination thereof. The controller has a controller Ethernet coupler 106 having a controller node 108, a controller node 110, a controller node 112, and a controller node 114.

To permit Ethernet connection, the FRU 104 has an FRU Ethernet coupler 116 having an FRU node 118, an FRU node 120, an FRU node 122, and an FRU node 124. The controller Ethernet coupler 106 and the FRU Ethernet coupler 116 are connected with an Ethernet cable 126 so that data can be carried between the FRU 104 and the controller 102 and so the controller 102 may power the FRU 104. The FRU nodes 118 and 120 may be referred to as FRU power nodes as each are operable to route power to the FRU 104. The FRU nodes 122 and 124 may be referred to as FRU return nodes as the power routed through the FRU nodes 118 and 120 ultimately flows and returns through the FRU nodes 122 and 124. Similarly, the controller node 114 may be referred to as a controller return node as it is coupled to a return voltage node 125.

For clarity, an Ethernet coupler is any component that can connect to Ethernet wires and may, for example, be the component inserted, such as a plug, or be the component receiving insertion, such as an Ethernet port. A node is any point that may be used to establish electrical connection and may be a pin, a socket, the joining of one or more conductive paths. A node can be a center-tap of a pair of sockets or pins. A node can refer collectively to a single conductive path or a pair of conductive paths of a coupler. As shown in FIG. 1, the nodes 108, 110, 112, 114, 118, 120, 122, and 124 are center tapped. Center tapping equalizes current and protects from electromagnetic disturbances.

The nodes 108, 110, 112, and 114 have corresponding positions such that each of the controller nodes 108 through 114 may receive the correct respective FRU nodes 118, 120, 122, or 124. The controller node 108 is correspondingly positioned with respect to the FRU node 118 such that controller node 102 is coupled to the FRU node 118 when the Ethernet cable 126 connects the controller Ethernet coupler 106 and the FRU Ethernet coupler 116. As can be seen by way of example in FIG. 1, the following nodes are also correspondingly positioned with respect to an Ethernet cable 126: controller node 108 to FRU node 118, controller node 110 to FRU node 120, controller node 112 to FRU node 122, and controller node 114 to FRU node 124.

The system 100 may be designed such that both Ethernet cables and crossover cables may be used with low power loss. Many systems have numerous cables, including both Ethernet cables and crossover cables. Crossover cables may look nearly identical to Ethernet cables. Accordingly, a user may mistakenly use an Ethernet cable instead of a crossover cable or a crossover cable instead of an Ethernet cable. Although a crossover cable is not shown in FIG. 1, controller node 110 and FRU node 118 are also correspondingly positioned with respect to a crossover cable, such that controller node 110 and FRU node 118 are coupled when the controller Ethernet coupler 106 is connected to the FRU Ethernet coupler 116 with a crossover cable. Also, the controller node 108 is correspondingly positioned to the FRU node 120 with respect to a crossover cable. Similarly, the controller node 112 and the controller node 114 are correspondingly positioned with respect to a crossover cable such that either of the controller nodes 112 and 114 can be connected to either the FRU nodes 122 and 124. As such, the controller 102 and the FRU 104 may be connected with an Ethernet cable or a crossover cable such that the controller nodes 108 and 110 are operable to be coupled to the power nodes 118 and 120 of the FRU 104. Similarly, the controller 102 and the FRU 104 may be connected with an Ethernet cable or a crossover cable such that the controller nodes 112 and 114 are operable to be coupled to the return nodes 122 and 124 of the FRU 104. Therefore, the system 100 is operable to provide POE with either a crossover cable or an Ethernet cable. One way of allowing a system to use both crossover cables and Ethernet cables is by using a diode bridge so that current may be received in either direction. But diode bridges cause additional power loss so do not provide the same efficiency as the depiction of the exemplary system 100 in FIG. 1.

The system 100 may also have nodes with corresponding positions relative to other types of Ethernet or crossover cables. The depiction in FIG. 1 simply depicts some embodiments for use with some example cables.

To determine whether the FRU 104 is connected to the controller 102, the controller 102 effectively "determines" whether it is receiving a return voltage, a short, at the controller node 112, which can be referred to as a detect node. Before the controller 102 is connected to the FRU 104, a comparator input node 128 is at a relatively high voltage due to being indirectly coupled to a voltage source 134. The coupling may be indirect as a converter such as a buck converter 136 may be used to step down the voltage for input into a comparator 130. The comparator input node 132 has a voltage due to being coupled to the voltage source 134. This reference voltage may be low due to the pulldown resistor 138 so the reference voltage is less than the initial relatively high voltage at the comparator input node 128. Therefore, the comparator output 140 does not yet drive a switch 144 while the FRU 104 is not connected, provided that the switch 144 is driven when receiving a low voltage. In the exemplary embodiment in FIG. 1, the switch 144 is a fuse but may be any other component used to create conductive paths or openings in response to the receipt of an electrical signal, lack thereof, or other stimulus.

When the controller Ethernet coupler 106 is connected to the FRU Ethernet coupler 116, the detect node 112 is driven low due to receiving a short upon connection to the FRU 104. The comparator 130 compares the voltage at the comparator input node 128 to the reference voltage at the comparator input node 132. Since the detect node 112 is low, the comparator input node 128 is low and less than the reference voltage at the comparator input node 132. The comparator 130 then outputs a low at the comparator output node 140. The comparator output node 140 is coupled to a control switch node 142 of the switch 144.

When the switch 144 receives a low from the comparator 130, the switch 144 permits current from the voltage source 134 to flow through a switch power terminal 146 to a switch output terminal 148 and to the controller nodes 108 and 110. The controller nodes 108 and 110, being coupled to the FRU nodes 118 and 120, are thereby operable to direct current into the FRU 104. Accordingly, when the controller Ethernet coupler 106 is connected to the FRU Ethernet coupler 116 with the Ethernet cable 126, the system 100 causes current flow from the voltage source 134, through the switch output node 148, to the controller nodes 108 and 110, and to the FRU nodes 118 and 120 to supply power to the FRU 104.

The controller 102 therefore effectively determines whether it is connected to the FRU 104 because it determines whether it receives a short at the detect node 112. Once it detects that the FRU is connected, it supplies power—saving power when the FRU 104 is not connected. Furthermore, the system 100 saves power by not using a processor or microcontroller to repeatedly check if the FRU 104 is connected.

The system 100 offers advantages upon the disconnect of the Ethernet cable 126 or a crossover cable. For example, the system 100 upon disconnect can stop powering the FRU 104 immediately, thereby saving power. When the FRU 104 is disconnected, the voltage on the comparator input node 128 rises immediately to the voltage supplied by the buck converter 136, which is above the hysteresis voltage of the comparator node 132, which thereby reopens the switch 144. The reopening of the switch 144 then disconnects the POE to the FRU 104 and resets the system 102 to the initial disconnect state. In other systems, continuous monitoring for a network disconnect is formed or continuous monitoring of currents is performed. Detecting a disconnect as per the system 100 offers advantages in speed and efficiency.

The system 100 also has other advantages. A relatively high steady state voltage difference between the comparator input node 128 and the comparator input node 132 can prevent temporary fluctuations which cause unintentional driving or opening of the switch 142. To increase the a steady-state voltage difference between the comparator input node 128 and the comparator input node 132, the switch output node 148 is coupled to the comparator input node 132. When the switch 144 is triggered to cause current flow from the voltage source 134 through the switch output node 148, additional current will flow from the switch output node 148 to the comparator input node 132, causing the steady state voltage difference between the comparator input nodes 128 and 132 to be greater.

Additionally, current spikes may occur in the system 100 upon, for example, shorting the detect node 112. Such current spikes may damage transformers in the system. To protect from such current spikes, the system 100 may include inductive coils 150 and 152. The inductive coil 150 is coupled to the controller return node 114, and the inductive coil 152 is coupled to the FRU return node 124. The inductive coils 150 and 152 prevent current spikes that could damage the magnetics of the system 100. The inductive coils 150 and 152 may be a network of inductive coils and not just single inductive coils.

Figure 2:
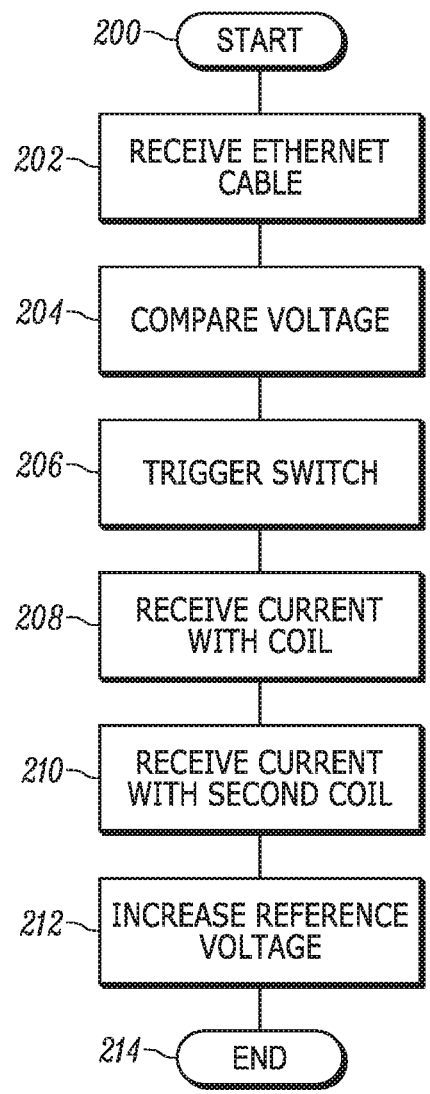
FIG. 2 is a flow chart of an exemplary method of selectively providing POE in accordance with some embodiments.

FIG. 2 depicts an exemplary method of selectively providing POE in accordance with some embodiments. The method starts at step 200. At step 202 the method includes receiving a cable coupled to a field replaceable unit (FRU) at a controller Ethernet coupler, thereby grounding a controller node. The grounding of the controller node is one way to ultimately permit the method to determine whether the FRU is connected. The cable can be an Ethernet cable or a crossover cable, and the controller node that is grounded can be different depending on which type of cable is used. For example, if an Ethernet cable is used, a first controller node may be grounded. If a crossover cable is used, a second controller node may be grounded. Alternatively at step 202, both the first controller node and the second controller node may be grounded if either an Ethernet cable or a crossover cable is used. In other embodiments, the grounding may be replaced with, for example, supplying a second reference voltage to the first controller node, a second controller node, or both. That second voltage reference can be selected to be higher or lower than the other voltage reference.

To determine whether the FRU is connected to a controller, at step 204 the method includes comparing a voltage at the first controller node of a controller Ethernet coupler against a voltage reference. At step 206 the method includes in response to the grounding the controller node, triggering a switch to cause current to flow to a second controller node of the controller Ethernet coupler, thereby supplying power to an FRU.

Supplying power to the FRU may cause current spikes in a return node of the system. To prevent high current from damaging any magnetics, at step 208, the method includes receiving a current drawn from a return node of the controller Ethernet coupler with at least a first inductive coil. At step 210, the method includes receiving a current drawn from a return node of the controller Ethernet coupler with at least a second inductive coil.

A relatively high steady state voltage difference between the voltage at the first comparator input node and the second comparator input node may cause unintentional supplying or interrupting power supplied to the FRU. Accordingly, at step 212, the method includes increasing the reference voltage in response to grounding the first controller node. The method includes ending at step 214.

The steps may be reconfigured, rearranged, removed, added to, substituted, or a combination thereof. For example, the method may include disconnecting an Ethernet or crossover cable and performing the method, or part of the method, in reverse order. The method may include repeating some or all of the steps with the same or a different cable connected again. For example, the method may include disconnecting an Ethernet cable, the repeating some or all of the steps upon connecting a crossover cable. The method may be used in accordance with any of the systems described above or components therein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a", "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system comprising:
    a field-replaceable unit (FRU), comprising an FRU Ethernet coupler comprising an FRU return node and an FRU power node, and
    a controller comprising:
        a controller Ethernet coupler comprising a first controller node and a second controller node, wherein:
            the first controller node and the FRU return node are correspondingly positioned such that when the controller Ethernet coupler is connected to the FRU Ethernet coupler with an Ethernet cable, the first controller node and the FRU return node are coupled, and when the controller Ethernet coupler is connected to the FRU Ethernet coupler with a crossover cable, the first controller node and the FRU return node are coupled; and
            the second controller node and the FRU power node are correspondingly positioned such that, when the controller Ethernet coupler is connected to the FRU Ethernet coupler with the Ethernet cable, the second controller node and the FRU power node are coupled;
        a comparator comprising a first comparator input node, a second comparator input node, and a comparator output node, the first controller node coupled to the first comparator input node; and
        a switch comprising a switch control node, a switch power node, and a switch output node, wherein the switch control node is coupled to the comparator output node;
        the switch power node is coupled to a voltage source, and the switch output node is coupled to the second controller node, such that the controller is thereby operable to:
            detect whether the FRU is connected to the controller by comparing a voltage at the first controller node to a reference voltage; and
            when the controller Ethernet coupler is connected to the FRU Ethernet coupler with the Ethernet cable, cause current flow from the voltage source, through the switch output node, to the second controller node, and to the FRU power node to supply power to the FRU.

2. The system of claim 1, wherein the controller Ethernet coupler further comprises a third controller node, the third controller node coupled to the switch output node, the third controller node and the FRU power node being correspondingly positioned such that when the controller Ethernet coupler is connected to the FRU Ethernet coupler with the crossover cable, the third controller node and the FRU power node are coupled and the controller is thereby operable to cause current flow from the voltage source, through the switch output node, to the third controller node, and to the FRU power node to supply power to the FRU.

3. The system of claim 1, wherein the switch output node is further coupled to the second comparator input node such that there is an increased steady-state voltage difference between the first comparator input node and the second comparator input node when the switch is triggered to cause current flow from the voltage source through the switch output node.

4. The system of claim 1, wherein the controller Ethernet coupler further comprises a controller return node, the controller return node coupled to at least a first inductive coil.

5. The system of claim 4, wherein the FRU Ethernet coupler further comprises a return FRU node, the return FRU node coupled to at least a second inductive coil.

6. A controller comprising:
    a controller Ethernet coupler comprising a first controller node and a second controller node, the controller Ethernet coupler operable to receive an Ethernet cable;
    a comparator comprising a first comparator input node, a second comparator input node, and a comparator output node, the first controller node coupled to the first comparator input node; and
    a switch comprising a switch control node, a switch power node, and a switch output node, wherein the switch control node is coupled to the comparator output node, the switch power node is coupled to a voltage source, and the switch output node is coupled to the second controller node, such that the controller is thereby operable to:
- detect whether a field-replaceable unit (FRU) is connected to the controller by comparing a voltage at the first controller node to a reference voltage, the voltage at the first controller node and the reference voltage based at least on a voltage supplied by a voltage converter and the voltage converter to step down an input source voltage; and
- when the controller Ethernet coupler is connected to an FRU Ethernet coupler, cause current flow from the voltage source, through the switch output node, and to the second controller node to supply power to the FRU.

7. The controller of claim 6, wherein the controller Ethernet coupler further comprises a third controller node, the third controller node coupled to the switch output node such that when the controller Ethernet coupler is connected to the FRU Ethernet coupler with a crossover cable, the controller is thereby operable to cause current flow from the voltage source, through the switch output node, and to the third controller node to supply power to the FRU.

8. The controller of claim 6, wherein the switch output node is further coupled to the second comparator input node such that there is an increased steady-state voltage difference between the first comparator input node and the second comparator input node when the switch is triggered to cause current flow from the voltage source through the switch output node.

9. The controller of claim 6, wherein the controller Ethernet coupler further comprises a controller return node, the controller return node coupled to at least a first inductive coil.

10. A method of selectively applying power over Ethernet (POE), the method comprising:
- comparing a voltage at a first controller node of a controller Ethernet coupler against a voltage reference, the voltage at the first controller node and the reference voltage based at least on a voltage supplied by a voltage converter and the voltage converter to step down an input source voltage;
- receiving an Ethernet cable coupled to a field replaceable unit (FRU) at the controller Ethernet coupler, thereby grounding the first controller node; and
- in response to the grounding the first controller node, triggering a switch to cause current to flow to a second controller node of the controller Ethernet coupler, thereby supplying power to the FRU.

11. The method of claim 10, further comprising:
- receiving the field replaceable unit (FRU) with a crossover cable at the controller Ethernet coupler, thereby grounding the first controller node; and
- in response to the grounding the first controller node, triggering the switch to cause current to flow to a third controller node of the controller Ethernet coupler, thereby supplying power to the FRU.

12. The method of claim 10, further comprising receiving a current drawn from a return node of the controller Ethernet coupler with at least a first inductive coil.

13. The method of claim 12, further comprising receiving a current drawn from a return node of the controller Ethernet coupler with at least a second inductive coil.

14. The method of claim 10, further comprising increasing the reference voltage in response to grounding the first controller node.

* * * * *